(12) United States Patent
Li et al.

(10) Patent No.: US 9,491,264 B2
(45) Date of Patent: Nov. 8, 2016

(54) EXTENSIBLE MESSAGING AND PRESENCE PROTOCOL (XMPP) BASED SOFTWARE-SERVICE-DEFINED-NETWORK (SSDN)

(71) Applicant: Futurewei Technologies, Inc., Plano, TX (US)

(72) Inventors: Li Li, Bridgewater, NJ (US); Wu Chou, Basking Ridge, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 236 days.

(21) Appl. No.: 14/185,661

(22) Filed: Feb. 20, 2014

(65) Prior Publication Data

US 2015/0237171 A1   Aug. 20, 2015

(51) Int. Cl.
*H04L 29/06* (2006.01)
*H04L 29/08* (2006.01)

(52) U.S. Cl.
CPC .............. *H04L 69/08* (2013.01); *H04L 67/02* (2013.01); *H04L 67/16* (2013.01)

(58) Field of Classification Search
CPC ..................................... H04L 29/08
USPC ........................................ 709/217
See application file for complete search history.

(56) References Cited

U.S. PATENT DOCUMENTS

| | | | |
|---|---|---|---|
| 2012/0226797 A1 | 9/2012 | Ghosh et al. | |
| 2013/0315231 A1* | 11/2013 | Rist | H04Q 3/62 370/352 |
| 2014/0129700 A1* | 5/2014 | Mehta | H04L 43/0817 709/224 |

FOREIGN PATENT DOCUMENTS

| | | |
|---|---|---|
| CN | 103051629 A | 4/2013 |
| EP | 2765751 A1 | 7/2013 |
| JP | 2012063816 A | 3/2012 |

OTHER PUBLICATIONS

Open Networking Foundation, "OpenFlow Management and Configuration Protocol (OF-Config 1.1)," Version 1.1, Jun. 25, 2012, 117 pages.
Open Networking Foundation, "OpenFlow Configuration and Management Protocol (OF-Config 1.0)," 2011, 73 pages.
Open Networking Foundation, "OpenFlow Switch Specification, Version 1.0.0, (Wire Protocol 0x01)," Dec. 31, 2009, 42 pages.
Open Networking Foundation, "OpenFlow Switch Specification, Version 1.1.0 Implemented, (Wire Protocol 0x02)," Feb. 28, 2011, 56 pages.

(Continued)

*Primary Examiner* — David Lazaro
*Assistant Examiner* — Zia Khurshid
(74) *Attorney, Agent, or Firm* — Conley Rose, P.C.

(57) ABSTRACT

A method for communicating between a plurality of Software-Service-Defined-Networks (SSDNs) comprising transmitting a data packet from a Network Element (NE) in a first SSDN domain to a component in a second SSDN domain by using an Extensible Messaging and Presence Protocol (XMPP), wherein the data packet comprises a destination address indicating an address of a XMPP server in the second domain. Also disclosed is a method of federating a plurality of SSDN domains implemented in a first XMPP server comprising receiving a login message from a first component positioned in a first SSDN domain, and in response to receiving the login message, advertising the first SSDN component to a second XMPP server positioned in a second SSDN domain via a first XMPP message.

20 Claims, 9 Drawing Sheets

(56) References Cited

OTHER PUBLICATIONS

Open Networking Foundation, "OpenFlow Switch Specification, Version 1.2, (Wire Protocol 0x03)," Dec. 5, 2011, 83 pages.

Saint-Andre, P., Ed., "Extensible Messaging and Presence Protocol (XMPP) : Core," Network Working Group, RFC 3920, Oct. 2004, 91 pages.

Farrel A., "Introduction to the Path Computation Element," ITU-T Workshop "NGN and its Transport Networks," Apr. 20-21, 2006, 16 pages.

Godfrey, et al., "Pathlet Routing," Proceedings of the ACM SIGCOMM 2009 conference on Data communication, Aug. 17-21, 2009, pp. 111-122.

Foreign Communication From a Counterpart Application, PCT Application No. PCT/CN2015/073115, International Search Report dated May 20, 2015, 7 pages.

Foreign Communication From a Counterpart Application, PCT Application No. PCT/CN2015/073115, Written Opinion dated May 20, 2015, 5 pages.

* cited by examiner

EXTENSIBLE MESSAGING AND PRESENCE PROTOCOL (XMPP) BASED SOFTWARE-SERVICE-DEFINED-NETWORK (SSDN)

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined networking (SDN) is a next generation data network in which the control plane is separated from the data plane and implemented in a software application. This architecture allows network administrators to have programmable central control of network traffic without requiring physical access to the network's devices. SDN decouples network control (e.g. learning and forwarding decisions) from the data plane used to forward network traffic. Decoupling the control plane from the data plane of the network enables the network controller to efficiently control the network traffic through globally optimized traffic engineering and routing, which departs from locally optimized shortest path forwarding (SPF). SDN may also simplify network operations, or even have the capabilities to flatten the network with extended data routing vectors. The extended data routing vectors in SDN can cover network information from multiple Open Systems Interconnection (OSI) layers (e.g. Layer 2 (L2) and/or Layer (L3)) for intelligent routing purposes. A basic approach to achieve decoupling of the network control from the network topology and data plane is by applying globally aware and topology decoupled software control at the edges of the network. The assumption is that traditional topology-coupled bridging and routing may be re-used at the core of the network so that scalability, interoperability, high availability, and extensibility of the conventional networking protocols, such as Internet Protocol (IP) networks can still be maintained.

SUMMARY

In one embodiment, the disclosure includes a method for communicating between a plurality of Software-Service-Defined-Networks (SSDNs) comprising transmitting a data packet from a Network Element (NE) in a first SSDN domain to a component in a second SSDN domain by using an Extensible Messaging and Presence Protocol (XMPP), wherein the data packet comprises a destination address indicating an address of a XMPP server in the second domain.

In another embodiment, the disclosure includes a method of federating a plurality of SSDN domains implemented in a first XMPP server comprising receiving a login message from a first component positioned in a first SSDN domain, and in response to receiving the login message, advertising the first SSDN component to a second XMPP server positioned in a second SSDN domain via a first XMPP message.

In another embodiment, the disclosure includes an apparatus comprising a processor configured to operate as a first component or a portion of a first component in a first SSDN domain, and initiate a communication session with a second component positioned in a second SSDN domain via a XMPP jingle message, and a transmitter coupled to the processor and configured to transmit the jingle initiate message to the second SSDN component via a SSDN service bus positioned in the first SSDN domain.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an SSDN that may communicate with other SSDNs using XMPP. An SSDN may be a modified SDN that supports direct communication between network control plane devices (e.g. instead of requiring all inter network plane devices communicate via the application plane) as discussed in U.S. Non-provisional patent application Ser. No. 13/829,076 filed Mar. 14, 2013 by Wu Chou et, al. and entitled "System and Apparatus of a Software-Service-Defined-Network (SSDN)," which is incorporated herein by reference as if reproduced in its entirety. A XMPP server may be positioned at the edge of the SSDNs domain. The XMPP server may be coupled to a XMPP client, which may act as an SSDN component and may be connected to an SSDN service bus. Components in the SSDN may communicate with components in other SSDN domains by forwarding messages across the service bus toward the XMPP server and client. Data may be transmitted with destination addresses in XMPP format. For example, the data may be addressed to Bus@Domain.com/Component, where Bus is the name of the appropriate SSDN service bus, Domain.com is the address of the XMPP server, and Component is the address of the destination SSDN component. Using this scheme, a XMPP server in the destination SSDN may receive the message and forward the message to the destination SSDN XMPP client, which may comprise the destination SSDN service bus address, for transmission across the destination service bus to the destination SSDN component. SSDN components and/or XMPP servers may employ XMPP and/or the XMPP Jingle protocol to advertise the presence of components across SSDN domains, initiate sessions between components, negotiate component to component communication protocols, forward SSDN messages, and/or terminate communication sessions. XMPP may also be employed to create multi-SSDN domain sessions to allow direct and/or substantially simultaneous communication between three or more SSDN domain network control layer components. Using XMPP, SSDN domains may also support dynamic addition and/or removal of network control layer components from ongoing inter-domain communication sessions.

Figure 1:
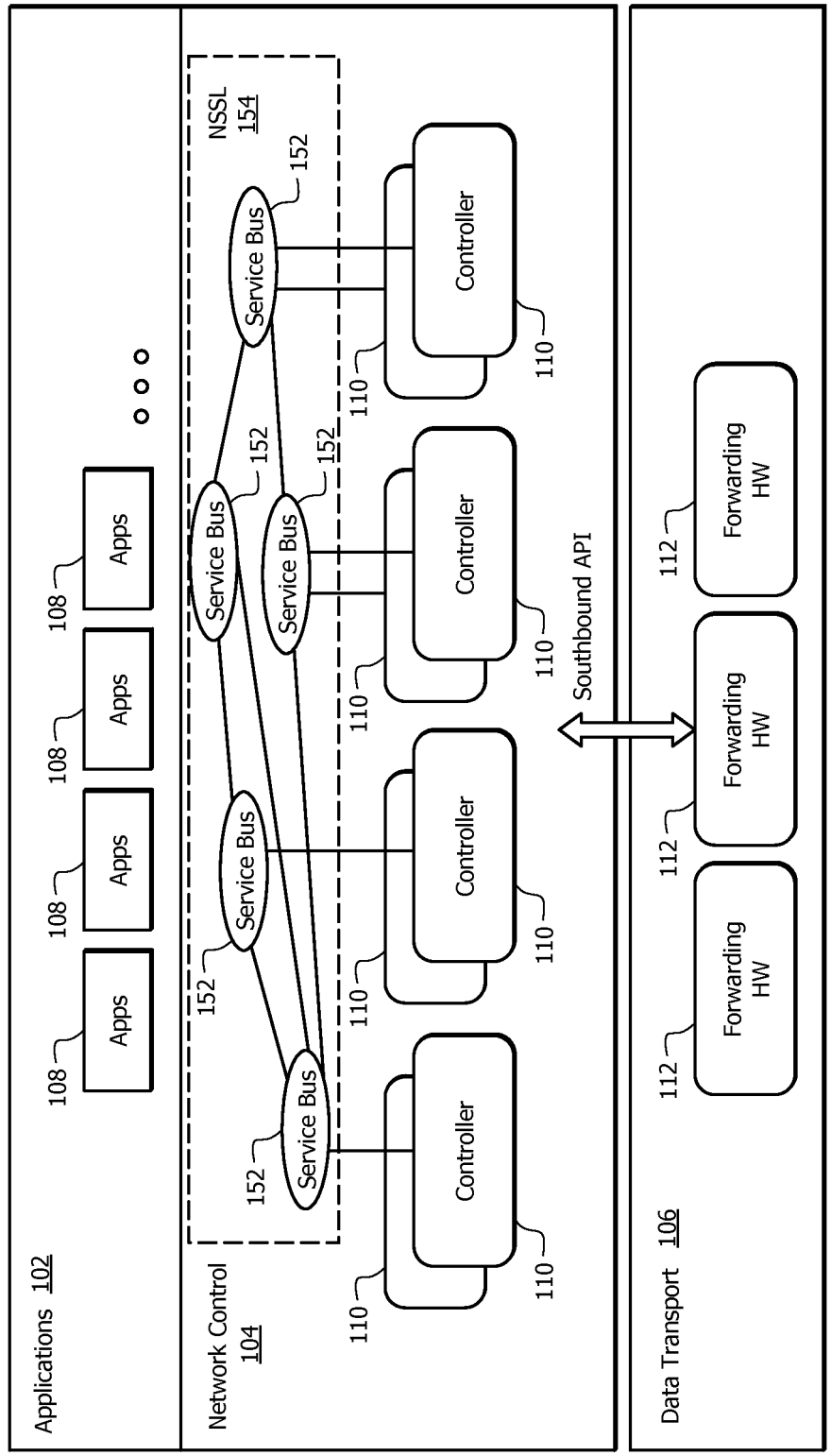
FIG. 1 is a schematic diagram of an embodiment of an SSDN paradigm.

FIG. 1 is a schematic diagram of an embodiment of an SSDN paradigm 100. An SSDN may be a Software Defined Network (SDN) that supports "east-west" network communications across a network control plane 104 (e.g. direct communication between network plane devices) in addition to the "north-south" network communications provided by an SDN (e.g. communications between the application layer 102 and the network control layer 104.) The SSDN paradigm 100 may comprise an application layer 102, a network control layer 104, and a data transport layer 106. The application layer 102 may be a network layer that abstracts and/or manages lower network layers based on user (e.g. network administrator) commands, for example via software applications. The application layer 102 may comprise a plurality of applications 108 that may be utilized to manage the network control layer 104 and/or the data transport layer 106. The network control layer 104 may determine paths for data packets to travel through a network. The network control layer 104 may comprise a plurality of controllers 110 (e.g., OpenFlow (OF) controllers), that may manage flow routing based on commands from the applications 108. The data transport layer 106 may forward data flows from a source to a destination based on the paths calculated by the network control layer 104 in accordance to commands from the application layer 102. The data transport layer 106 may comprise a plurality of forwarding hardware (HW) 112 (e.g. switches, routers, etc.) configured to receive forwarding instructions from the controllers 110 and route packets and/or data flows based on the controller 110 instructions. An Network Software Service Layer (NSSL) 154 may be positioned in the network control layer 104 and may provide a service plane for the network control and management functionalities provided by the network control layer 104. The NSSL 154 may provide a network service abstraction layer that supports an "east-west" network via service federation. In other words, the NSSL 154 may be configured to support the addition of controllers 110 and forwarding HW 112 within the network control layer 102 and the data transport layer 106, respectively, for example with limited interaction and/or direct control from the application layer 102. The NSSL may comprise a plurality of service buses 152 that may provide a distributed service access layer. The service buses 152 may support service mobility, migration, failover, and load balancing of the controllers 110. Furthermore, the service buses 152 may support a variety of services, such as service computing operations of late binding, service discovery, service morphing, and service planning. The services may be implemented using hardware, software, or a combination of both. In another embodiment, the NSSL 154 may be a separate logical layer and may exist between the application layer 102 and the network control layer 104.

Figure 2:
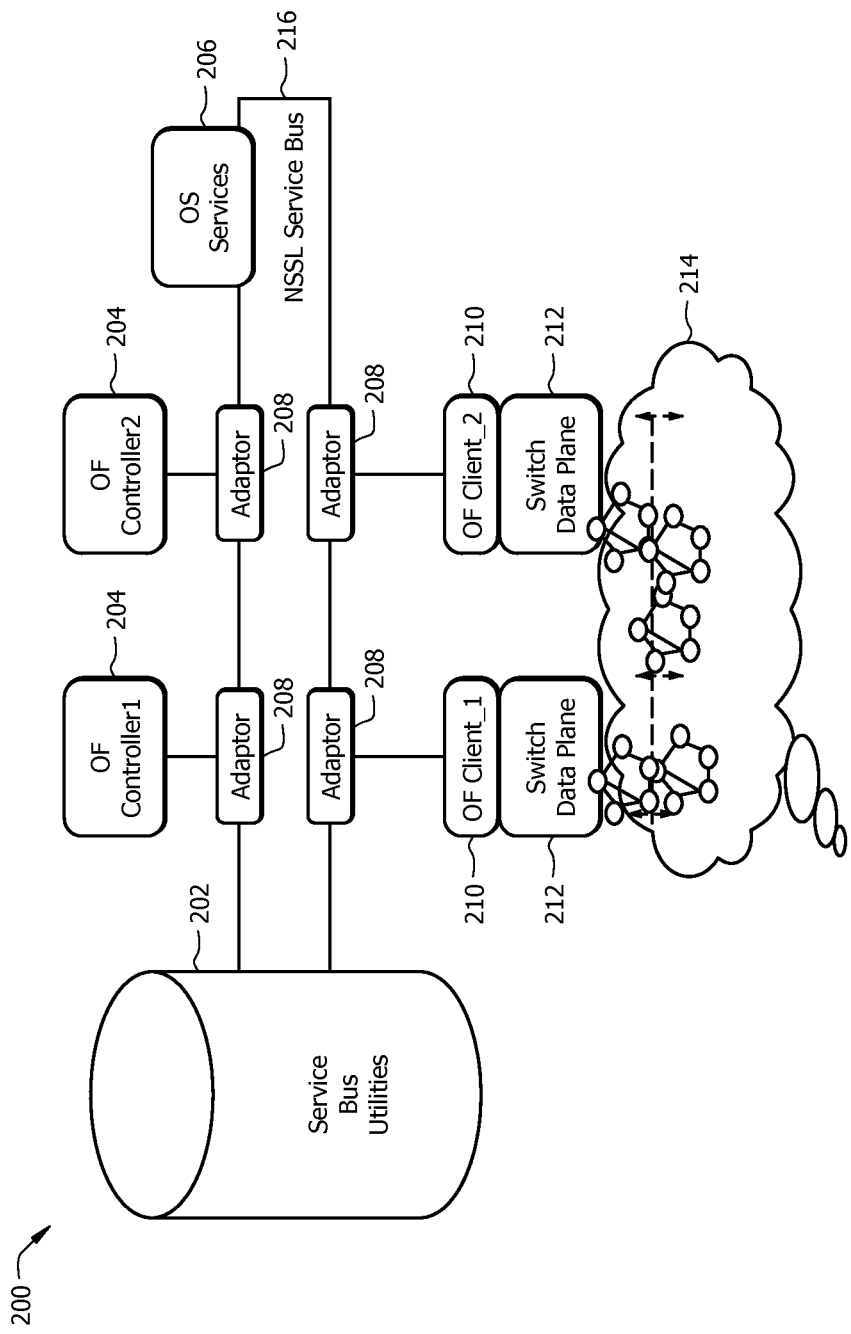
FIG. 2 is a schematic diagram of an embodiment of an SSDN.

FIG. 2 is a schematic diagram of an embodiment of an SSDN 200, which may be an implementation of SSDN paradigm 100. The SSDN 200 may support advanced service computing operations such as late binding, service discovery, service morphing, and service planning. The SSDN network 200 may provide a logical, centralized, and physically distributed global network view for networking to compute routing amongst a plurality of Openflow (OF) controllers 204. The SSDN network 200 may provide a service composition framework through the NSSL service bus 216 that may support northbound and/or southbound communications (e.g. to applications 108). The SSDN network 200 may comprise service bus utilities node 202, a plurality of OF controllers 204, network operating system (OS) services node 206, an NSSL service bus 216, a plurality of adapters 208, a plurality of OF clients 210, a switch data plane 212, and a network 214. The NSSL may comprise a variety of service components, such as the service bus utilities node 202, the OF controllers 204, OS services node 206, adapters 208, OF clients 210, and NSSL service bus 216. In one embodiment, SSDN network 200 may represent local SSDN networks 200 coupled together to form a global SSDN network.

The service bus utilities node 202 may comprise data storage and may store various service bus utilities, such as utilities facilitating communication and interaction between the OF controllers 204. The service bus utilities node 202 may facilitate the transfer of various service bus utilities via the NSSL service bus 216. The NSSL service bus 216 may be a distributed service access layer, which may act as a service plane for network control and management. The NSSL service bus 216 may provide a generic network service abstraction layer that may support "east-west" network expansion via service federation. Service federation may be the process through which the NSSL service bus 216 from different autonomous systems (AS) can share their services. The NSSL service bus 216 may be an architecture that may provide service registration, service discovery, message addressing, message routing, and other services for OF controllers 204, OF clients 210, and other service components coupled to the NSSL service bus 216. In one embodiment, the NSSL service bus 216 may be a local NSSL service bus that may be coupled with other local NSSL service buses. In another embodiment, the NSSL service bus 216 may represent a global NSSL service bus 216 that comprises one or more local NSSL service buses that spans across multiple networks 214. The NSSL service bus 216 may comprise processor(s), logic unit(s), and/or storage unit(s).

OF controllers 204 and the OF clients 210 may be coupled to the NSSL service bus 216 via the adaptors 208. The adaptors 208 may be configured to act as the service interface for the OF controllers 204 and OF clients 210. By coupling the OF controllers 204 to the adaptors 208, the NSSL service bus 216 may provide load balancing between the OF controllers 204. The NSSL service bus 216 may also promote communication between the OF controllers 204 such that each OF controller's 204 Network Information Base (NIB) may comprise the same entries such that routing decisions made by either of the OF controllers 204 are the same. The NSSL service bus 216 may provide the ability to add additional OF controllers 204 as necessary in order to adequately manage and control SSDN network 200. The NSSL service bus 216 may provide service composition, service discovery, service management, service fail over, and load balancing between the OF controllers 204, and between the OF controllers 204 and the OF clients 210. The NSSL service bus 216 may provide "east-west" network expansion capability through NSSL service bus federation and may provide a consistent service oriented framework.

The OF controllers 204 may be configured to implement control plane functions and to control and manage OF clients 210. Control plane functions may include route or path determination for data packets traversing the network 214. More specifically, OF controllers 204 may be able to produce routing tables and/or flow tables that may define how data packets may be routed within network 214. OF controller 204 may provide control services to both OF client_1 210 and OF client_2 210. Similarly, OF controller 204 may also provide control services to both OF client_1 210 and OF client_2 210. The OF controller 204 may not perform data plane functions, such as forwarding data traffic to a selected destination within network 214. The OF controllers 204 may deploy network resources to the NSSL as services via the corresponding adaptors 208. In one embodiment, the services may be addressed by service names and may support service mobility, migration, failover, and load balancing.

The OF clients 210 may be clients of the OF controllers 204, such as OF switches. The OF clients 210 may provide data forwarding for network 214. The OF client 210 may comprise a switch data plane 212 configured to route data through the network 214. OF clients 210 may be any physical and/or virtual network device that receives and transmits data through network 214. OF clients 210 may comprise switches, routers, bridges, or any other devices compatible with southbound Application Programming Interface (API) services from the network control plane (e.g. network control plane 104). For example, OF clients 210 may be configured according to the OpenFlow protocols as defined in Rev. 1.2 for the OpenFlow specification of the OpenFlow Organization, published December 2011, which is incorporated herein as if reproduced in its entirety. Furthermore, OF clients 210 may also include network devices that are compliant with other versions of the OpenFlow protocols (e.g. Rev. 1.0 and Rev. 1.1). In one embodiment, OF clients 210 may be incompatible with other versions of the OpenFlow protocols. For example, one OF client 210 may support the OpenFlow protocol version 1.0, but not later versions, while another OF client 210 may support the OpenFlow protocol version 1.2, but not earlier versions.

The OS services node 206 may be a network OS that provides facilities for addressing the OF controllers 204. The OS services node 206 may be independent of various programming languages. The OS services node 206 may be configured to manage network resources, including physical and virtual networks, for network applications. For example, the OS services node 206 may be implemented to manage data, users, groups, security, applications, and other networking functions. In one embodiment, the OS services node 206 may operate and perform functions in the OSI layer 3 within one or more network devices, such as routers, switches, and servers.

Figure 3:
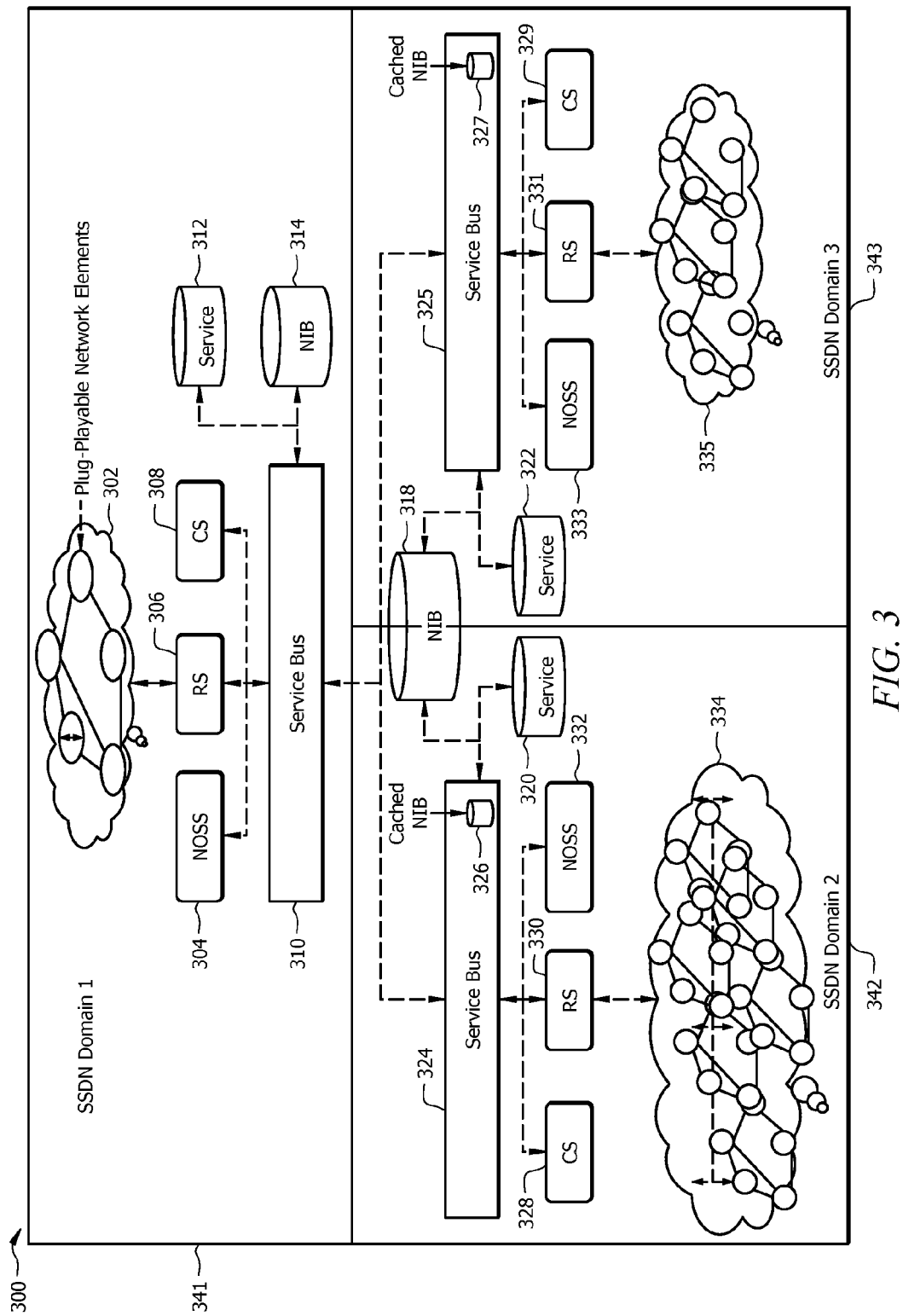
FIG. 3 is a schematic diagram of an embodiment of a federated network of SSDN domains.

FIG. 3 is a schematic diagram of an embodiment of federated network 300 of SSDN domains. As discussed above, by implementing NSSL, the SSDN network 300 may provide a network service abstraction layer that supports the "east-west" network via service federation. Federated network 300 may comprise SSDN domains 341, 342, and 343 coupled by a plurality of local service buses 310, 324, and 325 for networks 302, 334, and 335, respectively. Each SSDN domain 341, 342, and 343 may comprise a plurality of NEs, components, and/or other items that are not configured for inter-domain communication to promote network separation and network security. The coupling of the local service buses 310, 324, and 325 (e.g. via federation) may form a global service bus that spans across multiple network domains (e.g. SSDN domain 341, 342, and 343). With a global service bus, the SSDN network 300 may combine routing services, control services, and network OS services (NOSS) component for networks 302, 334, and 335 to form a globally federated network 300 of SSDN domains. In one embodiment, networks 302, 334, and 335 may be different ASs that share services via coupled local service buses 310, 324, and 325 to form a global service bus. As shown in FIG. 3, local service bus 310 may be coupled to a Network Information Base (NIB) 314, while the local service buses 324 and 325 located within the SSDN domains 342 and 343 may share a NIB 318 positioned at the edge of both domains. Other embodiments of SSDN network 300 may have separate NIBs 314 coupled to each local service buses 310, 324, and 325 or share one global NIB 318 amongst the local service buses 310, 324, and 325.

Local service bus 310 may be positioned in SSDN domain 341 and may be coupled to a service bus utilities node 312 and to a NIB 314. The service bus 310 may be configured to perform functions substantially similar to NSSL service bus 216. The service bus utilities node 312 may be configured to perform functions substantially similar to the service bus utilities node 202. The NIB 314 may maintain and provide supporting information for resource utilization and traffic control amongst one or more networks. For instance, the NIB 314 may provide multiple methods for the control logic to gain access to network nodes, an index of all of the network nodes based on network node identifiers, track state information of network nodes, network traffic flow information, and/or data regarding network node features and capabilities. The NIB 314 may store a graph of the forwarding HWs within a network topology instead of storing prefixes to destinations found in routing information bases (RIBs) or forwarding information bases (FIBs). Furthermore, the NIB 314 may support logical elements (e.g. overlay tunnels) within a network.

Local service bus 310 may also be coupled to NOSS component 304, routing services (RS) component 306, and controller services (CS) component 308. The NOSS component 304 may be substantially similar to OS services node 206. The RS component 306 may be coupled to network nodes within network 302. The RS component 306 may implement algorithms to forward packets between network nodes (e.g. perform data forwarding plane functions). In one embodiment, the RS component 306 may forward data traffic as performed by a SDN/OpenFlow switch in the data forwarding plane. In one embodiment, network nodes within network 302 may be configured as plug-and-play network nodes. The CS component 308 may be a plurality of controllers coupled together through the service bus 310.

The CS component 308 may implement strategies to control the flow of data packets in network 302 as performed by an SDN controller in the control plane of the SDN.

SSDN domain 342 may comprise a service bus 324, a CS component 328, an RS component 330, a NOSS component 332, and a service bus utilities node 320, which may be substantially similar to service bus 310, CS component 308, an RS component 306, NOSS component 304, and service bus utilities node 312. SSDN domain 343 may comprise a service bus 325, a CS component 329, an RS component 331, a NOSS component 333, and a service bus utilities node 322, which may be substantially similar to service bus 310, CS component 308, an RS component 306, NOSS component 304, and service bus utilities node 312. Service buses 324 and 325 may share access to a global NIB 318, which may be substantially similar to NIB 314 and may comprise data related to both SSDN domains 342 and 343. SSDN domain 342 and SSDN domain 343 may comprise a cached NIB 326 and cached NIB 327, respectively. The cached NIBs 326 and 327 may cache (e.g. store) data from global NIB 318 for rapid use by components in their respective network domains 312 and 343. It should be noted that in some embodiments, SSDN domains 342 and 343 may each be considered sub-networks of an SSDN domain comprising both domains 342 and 343.

Figure 4:
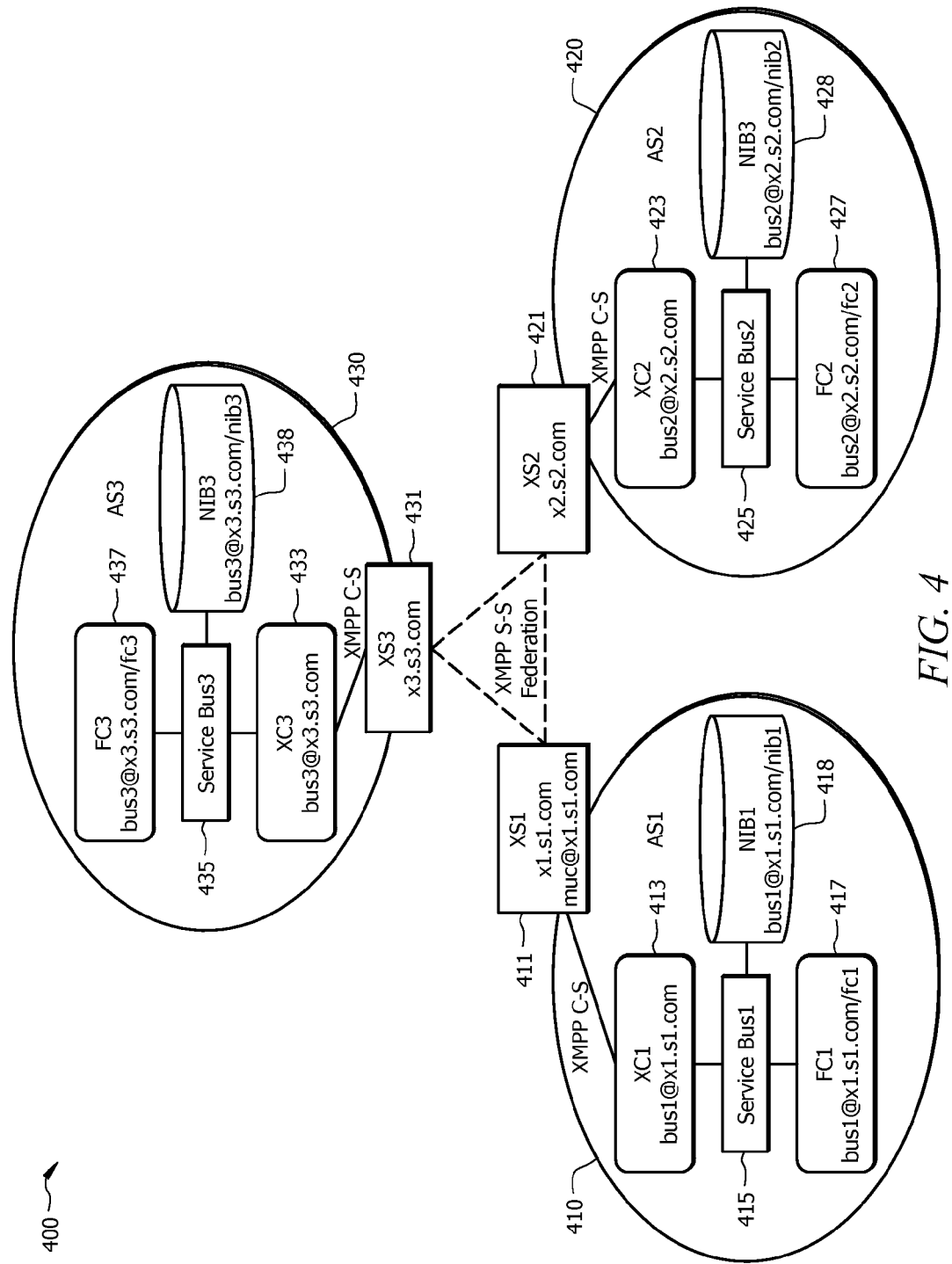
FIG. 4 is a schematic diagram of another embodiment of a federated network of SSDN domains.

FIG. 4 is a schematic diagram of another embodiment of a federated network 400 of SSDN domains. Network 400 may comprise SSDN domains 410, 420, and 430, and may each be substantially similar to SSDN domains 341, 342, and/or 343. Each SSDN domain 410, 420, and/or 430 may comprise an AS. SSDN domain 410 may comprise a first service bus (Service Bus 1) 415 and a first NIB (NIB1) 418, which may be substantially similar to a service bus 310, 324, and/or 325, and NIB 314 and/or 318, respectively. SSDN domain 410 may further comprise a XMPP server (XS1) 411 positioned at the edge of the domain, a XMPP client (XC1) 413, and a federation controller (FC1) 417. XMPP client 413, XMPP server 411, and federation controller 417 may be considered SSDN components of SSDN domain 410, may be connected via the service bus 415, and may operate in a manner similar to the SSDN components of network 300 (e.g. NOSS, RS, CS, service bus utilities node, and/or NIB) with different functionalities.

XMPP client 413 and XMPP server 411 may operate to communicate with the other SSDN domains 420 and/or 430 via XMPP. XMPP client 413 may receive communications over the service bus 415 and forward any inter-domain messages to the XMPP server 411 for transmission via XMPP. XMPP server 411 may also receive messages from the other SSDN domains 420 and/or 430 via XMPP and forward such messages to the XMPP client 413 for transmission to other SSDN domain 410 components via the service bus 415. The federation controller 417 may manage inter-domain SSDN federation and/or related communications by transmitting and/or receiving messages across the service bus 415 to/from the XMPP client 413 and the XMPP server 411. SSDN domain 420 may comprise a federation controller (FC2) 427, a service bus (Service Bus2) 425, a NIB (NIB2) 428, a XMPP client (XC2) 423, and a XMPP server (XS2) 421, which may be substantially similar to federation controller 417, service bus 415, NIB 418, XMPP client 413, and XMPP server 411, respectively. SSDN domain 430 may comprise a federation controller (FC3) 437, a service bus (Service Bus3) 435, a NIB (NIB3) 438, a XMPP client (XC3) 433, and a XMPP server (XS3) 431, which may be substantially similar to federation controller 417, service bus 415, NIB 418, XMPP client 413, and XMPP server 411, respectively.

Accordingly, domains 410, 420, and 430 may communicate by transmitting messages between XMPP servers 411, 421, and 431, respectively. Such messages may then be forwarded to XMPP clients 413, 423, and 433, respectively for intra-domain transmission to appropriate SSDN components via service bus 415, 425, and 435 respectively. In order to communicate via XMPP, network 400 components may receive addresses according to a XMPP Jabbers Identifier (JID) format, so that the components may be uniquely designated in an inter-domain XMPP message. For example, each XMPP server 411, 421, and 431 may receive a unique domain identifier so that all messages related to a particular domain are routed to the associated XMPP server. The XMPP server 411, 421, and 431 address may be indicated in the form of Y.com, where Y indicates the associated XMPP server. In the embodiment of network 400, XMPP servers 411, 421, and 431 have been assigned the example domain identifiers of x1.s1.com, x2.s2.com, and x3.s3.com, respectively.

The XMPP clients 413, 423, and 433 may each serve as an access point to the services buses 415, 425, and 435, respectively, for communications received from other domains. Accordingly, XMPP clients 413, 423, and 433 may each receive a JID node identifier related to the service bus 415, 425, or 435, respectively, to which the associated XMPP client is attached. In the embodiment of network 400, XMPP clients 413, 423, and 433 have been assigned the example JID node identifiers of bus1, bus2, and bus3, respectively. Components in a domain 410, 420, and/or 430 may each be designated by a unique JID resource identifier so that messages forwarded over service buses 415, 425, and 435, respectively, may be routed to the appropriate component(s). In the embodiment of network 400, components FC1 417, NIB1 418, FC2 427, NIB2 428, FC3 437, and NIB3 438 may be designated by the example JID resource identifiers of fc1, nib1, fc2, nib2, fc3, and nib3, respectively. By employing the forgoing addressing scheme, a component in a first SSDN domain may transmit a message to a component in a second SSDN domain by encoding the message with a destination address in JID format and forwarding the message over the first domains service bus. The destination address may take the form X@Y/Z, where X indicates the second domains service bus/XMPP client, Y indicates the second domains XMPP server, and Z indicates the second domain component. It should be noted that the identifiers employed herein are only examples and that any identifiers used in conjunction with the form X@Y/Z may be employed within the scope of the present disclosure.

For example, component FC1 417 may transmit a message to component FC3 437 by employing the destination address bus3@x3.s3.com/fc3. The message may be transmitted from FC1 417 over service bus 415. XMPP client 413 may receive the message, determine the message is intended for another domain, and may forward the message to XMPP server 411. Either XMPP server 411 or XMPP client 413 may convert the message to XMPP format on an as needed basis. XMPP server 411 may review the destination address, determine the domain address of x3.s3.com indicates XMPP server 431, and may forward the message accordingly. XMPP server 431 may determine that the message is intended for XMPP client 435 based on the node identifier of bus3 and may forward the message. XMPP client 435 may determine that the message is intended for FC3 based on the resource identifier of fc3. XMPP client 435 may convert the message to a SSDN format as needed and may forward the message across service bus 435. Service bus 435 may then forward the message to FC3 437. As shown above, any component in a SSDN domain 410, 420, and/or 430 may transmit an "east-west" message to any component in any other SSDN domain by addressing the packet accordingly and forwarding the message across an attached service bus. By employing the addressing scheme shown above, the transmitting component may send a message to a destination component without maintaining an awareness of network addresses of NE(s) implementing the destination component. Accordingly, component implementation may change dynamically in the remote domain without affecting transmissions from the standpoint of the transmitting domain.

Network 400 may also support a XMPP communication session between a plurality of SSDN domains. XMPP communication sessions between two SSDN domains 410, 420, and/or 430 may be accomplished by direct communication between the associated XMPP servers 411, 421, and/or 431. XMPP communication sessions between three or more SSDN domains 410, 420, and/or 430 may be accomplished by a XMPP Multi-User Conference (MUC). In a MUC, an inter-domain message transmitted by a first XMPP server (e.g. XMPP server 411, 421, and/or 431) may be broadcast to all XMPP servers that have joined the MUC. For example, XMPP server 411 may create a MUC with an address muc@x1.s1.com. Components in domains 410, 420, and/or 430 may broadcast a message to other domains by addressing the message to muc@x1.s1.com. Such a message may be received by XMPP server 411, may be transmitted to all other domains in the MUC, and may be forwarded to components in domain 410 that have joined the MUC. For example, assuming FC1 417, FC2 427, and FC3 437 have joined a MUC, FC1 417 may transmit a message to muc@x1.s1.com, which may be broadcast by XMPP server 411 to both XMPP servers 421 and 431 for delivery to FC2 427 and FC3 437, respectively. As another example, FC2 427 may transmit a message to muc@x1.s1.com, which may be received by XMPP server 411, forwarded to FC1 417 via service bus 415, and forwarded to FC3 437 via XMPP server 431.

As discussed above, XMPP may be employed in an SSDN architecture. Such a combination may allow for a separation of a XMPP federation protocol from control protocols negotiated between federated service components (e.g. in different SSDN domains). Federated service buses may be treated in a manner similar to Voice Over IP (VOIP) endpoints. SSDN components (e.g. NIBs) may be treated in a manner similar to media resources such as audio codecs. Control protocols/components, such as Pathlet routers, Path Computation Elements (PCEs), etc., may be treated in manner similar to media transport protocols such as Real Time Transport (RTP) protocol, User Datagram Protocol (UDP), etc. Further, as discussed below, XMPP jingle protocol may be employed to connect service components over services buses in different SSDN domains into a common federation session.

Figure 5:
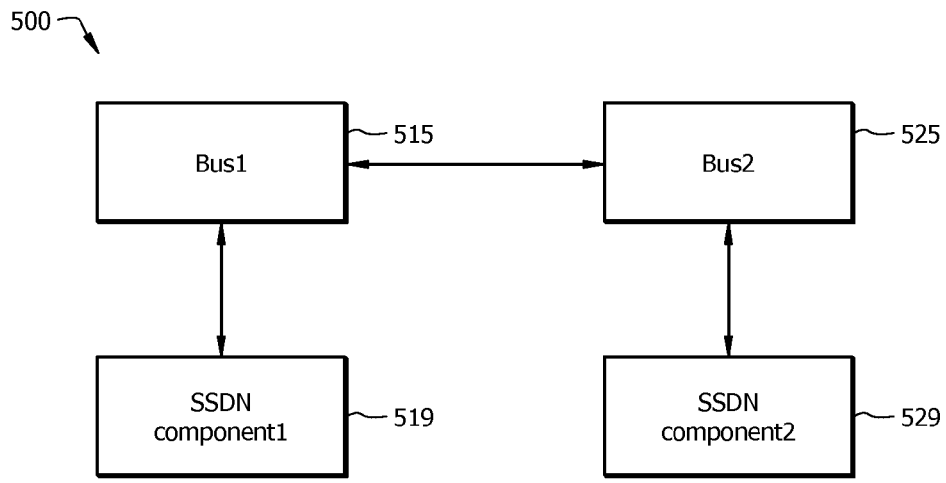
FIG. 5 is a schematic diagram of an embodiment of partial network of communicating SSDN components.

FIG. 5 is a schematic diagram of an embodiment of partial network 500 of communicating SSDN components. Network 500 may be substantially similar to network 400, with certain components omitted for clarity of discussion. Network 500 may comprise a first SSDN component 519 connected to a first service bus 515 in a first domain and a second SSDN component 529 connected to a second service bus 525 in a second domain. Service buses 515 and 525 may be substantially similar to service buses 415, 425, and/or 435. SSDN components 519 and 529 may each be any components in SSDN domains, such as a NIB, a federation controller, a NOSS, a RS, a CS, an OS, a service bus utilities node, etc. In network 500, all communications between SSDN component 519 and SSDN component 529 may be routed via service buses 515 and 525, for example via XMPP messages and/or Extensible Markup Language (XML) streams.

Figure 6:
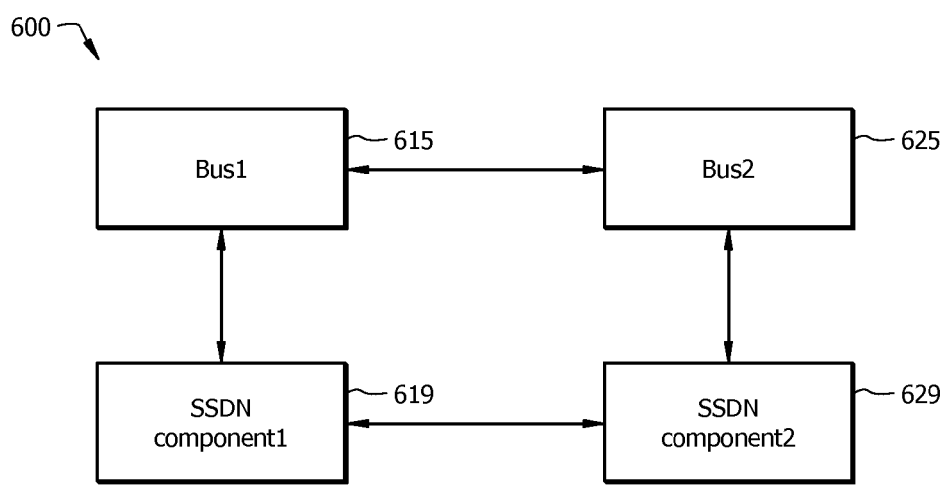
FIG. 6 is a schematic diagram of another embodiment of partial network of communicating SSDN components.

FIG. 6 is a schematic diagram of another embodiment of partial network 600 of communicating SSDN components. Network 600 may be substantially similar to network 500. Network 600 may comprise a first SSDN component 619, a first service bus 615, a second SSDN component 629, and a second service bus 625 in a second domain. In contrast to network 500, network 600 may support direct communication between the first SSDN component 619 and the second SSDN component 629. For example, the first SSDN component 619 and the second SSDN component 629 may communicate via service buses 615 and 625 to initiate a session and/or negotiate a communication protocol. Upon exchanging appropriate information, the first SSDN component 619 and the second SSDN component 629 may communicate directly using an agreed upon protocol compatible with both components.

The implementation of network 500 may support allow for independence between the SSDN components 519 and 529 and may allow legacy components to communicate without modification. The implementation of network 500 may also increase traffic over the service buses 515 and 525 and increase the need for additional hardware to support the service buses 515 and 525. The implementation of network 600 may minimize bus 615 and 625 network traffic and allow legacy buses to operate without modification. The implementation of network 600 may also require modification of legacy components and may expose information contained in the components 619 and 629 to the other domain. For example, an owner of the first domain may not wish to expose an NIB acting as SSDN component 619 to the second domain in the case that the second domain is owned by a different entity. As such, a network 400 may employ the communication schemes of network 500, network 600, or combinations thereof.

Figure 7:
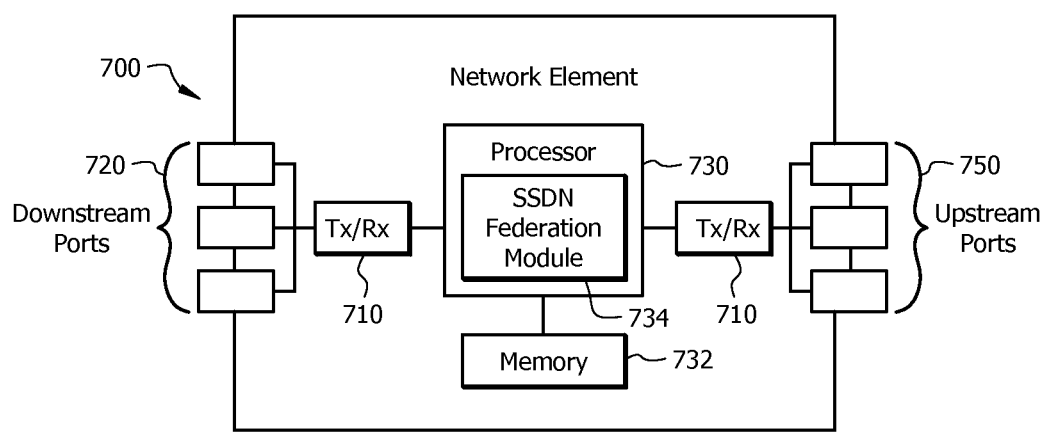
FIG. 7 is a schematic diagram of an embodiment of an NE within an SSDN.

FIG. 7 is a schematic diagram of an embodiment of an NE within an SSDN, which may operate all or a portion of an SSDN component such as a federation controller, a XMPP server, a XMPP client, an NIB, service bus, etc. NE 700 may be configured to communicate messages between SSDN domains using XMPP, for example by implementing an SSDN XMPP addressing scheme. NE 700 may be implemented in a single node or the functionality of NE 700 may be implemented in a plurality of nodes. In some embodiments NE 700 may also act as other node(s) in network 100, 200, 300, 400, 500, and/or 600. One skilled in the art will recognize that the term NE encompasses a broad range of devices of which NE 700 is merely an example. NE 700 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 700. For instance, the features/methods in the disclosure may be implemented using hardware, firmware, and/or software installed to run on hardware. The NE 700 may be any device that transports frames through a network, e.g., a switch, router, bridge, server, a client, etc. As shown in FIG. 7, the NE 700 may comprise transceivers (Tx/Rx) 710, which may be transmitters, receivers, or combinations thereof. A Tx/Rx 710 may be coupled to plurality of downstream ports 720 (e.g. downstream interfaces) for transmitting and/or receiving frames from other nodes and a Tx/Rx 710 coupled to plurality of upstream ports 750 (e.g. upstream interfaces) for transmitting and/or receiving frames from other nodes, respectively. A processor 730 may be coupled to the Tx/Rxs 710 to process the frames and/or determine which nodes to send frames to. The processor 730 may comprise one or more multi-core processors and/or memory devices 732, which may function as data stores, buffers, etc. Processor 730 may be implemented as a general processor or may be part of one or more application specific integrated circuits (ASICs) and/or digital signal processors (DSPs). Processor 730 may comprise an SSDN federation module 734, which may address SSDN packets using XMPP JID format, communicate with SSDN components in other SSDN domains, and/or perform other SSDN based inter-domain communication related functions. In an alternative embodiment, SSDN federation module 734 may be implemented as instructions stored in memory 732, which may be executed by processor 730. In another alternative embodiment, the SSDN federation module 734 may be implemented on separate NEs. The downstream ports 720 and/or upstream ports 750 may contain electrical and/or optical transmitting and/or receiving components and may support "north-south" and/or "east-west" communications.

It is understood that by programming and/or loading executable instructions onto the NE 700, at least one of the processor 730, SSDN federation module 734, downstream ports 720, Tx/Rxs 710, memory 732, and/or upstream ports 750 are changed, transforming the NE 700 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 8:
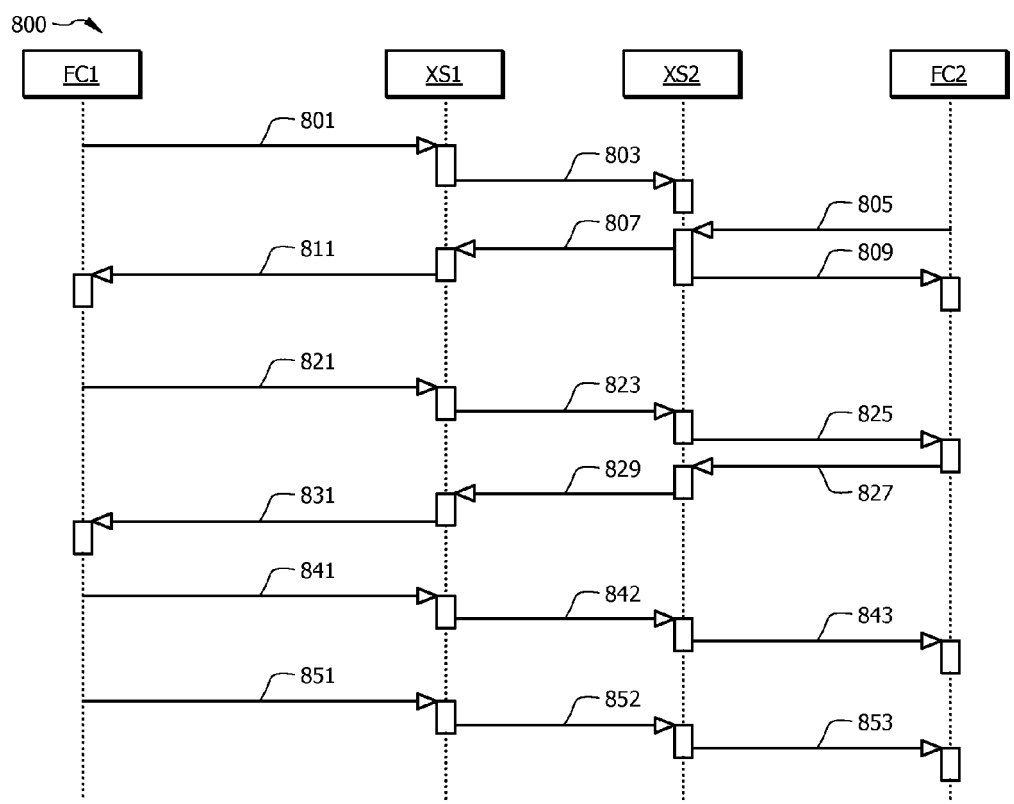
FIG. 8 is a protocol diagram of an embodiment of a method of SSDN federation.

FIG. 8 is a protocol diagram of an embodiment of a method 800 of SSDN federation. Method 800 may be employed to federate a plurality of SSDN domains via XMPP, for example using the addressing scheme of network 400. For example, a first SSDN domain may comprise a first federation controller (FC1) and a first XMPP server (XS1) and a second SSDN domain may comprise a second federation controller (FC2) and a second XMPP server (XS2). FC1 and FC2, and XS1 and XS2, may be substantially similar to FC1 417, FC2 427, and/or FC3 437 and XS1 413, XS2 423, and/or XS3 433, respectively. For purposes of clarity, the example addresses employed in network 400 are employed by method. At step 801, FC1 may login to a service bus in the first domain by transmitting a login message to bus1@x1.s1.com. The login message of step 801 may be forwarded to XS1 via the service bus and a XMPP client in the first domain. At step 803, XS1 may transmit a message toward XS2 to indicate the presence of FC1 in the first domain. At step 805, FC2 may login to a service bus in the second domain by transmitting a login message to bus2@x2.s2.com. The login message of step 805 may be forwarded to XS2 via the service bus and a XMPP client in the second domain. Upon receiving the login message of FC2 at step 805, XS2 may advertise the presence of FC2 to XS1 at step 807 and advertise the presence of FC1 to FC2 at step 809. It should be noted that steps 807 and 809 may be performed substantially simultaneously and/or in any order. XS 1 may receive the message of step 807 from XS2 and may forward the message to FC1 at step 811 so that FC1 may be aware of the presence of FC2.

Upon learning of FC2, FC1 may determine to initiate a XMPP session with FC2. At step 821, FC1 may transmit a jingle session initiate message to bus2@x2.s2.com/fc2. XS1 may receive the message of step 821 and may forward the message to XS2 based on the JID domain identifier at step 823. At step 825, XS2 may forward the jingle session initiate message to FC2 via the second domain bus based on the messages node and resource identifiers. FC2 may determine to accept the session, and may transmit a jingle session accept message toward FC1 at step 827 by addressing the message destination as bus1@x1.s1.com/fc1. The message of step 827 may be forwarded by XS2 to XS1 at step 829 and forwarded from XS1 to FC1 at step 831. Upon receiving the jingle session accept message of steps 827, 829, and 831, the session may be setup between FC1 and FC2. FC1 may transmit SSDN messages to FC2 via XS1 and XS2 at steps 841, 842, and 843. The SSDN messages of steps 841, 842, and 843 may be sent via XML streams and/or sent between the SSDN components via other native protocols. While the messaging of steps 841-843 is unidirectional (e.g. from FC1 to FC2), it should be noted communication may also be bidirectional (e.g. also comprising messages from FC2 to FC1). Upon completion of transmission of the SSDN messages of steps 841, 842, and 843, FC1 may determine to terminate the communication session. At step 851, FC1 may transmit a jingle session terminate message FC2 by addressing the message to bus2@x2.s2.com/fc2. The message may be forwarded via the first domain bus and XMPP client to the XS1 at step 851, to between domains to XS2 at step 852, and to FC2 via the second domain XMPP client and service bus at step 853.

It should also be noted that the jingle initiate message of steps 821, 823, and 825 and the jingle accept message of steps 827, 829 and 831 may be employed to negotiate a protocol for sending SSDN messages outside of XMPP, as discussed in network 600. For example, the jingle session initiate message and/or the jingle session accept message may include a content add action, which may specify other SSDN components and/or available protocols for direct communication. The content add action may also be transmitted in other jingle messages during an ongoing Jingle session. As an example, the first SSDN domain may comprise a Path Computation Element (PCE) component configured to perform route calculations across the first SSDN domain. The content add action may be employed to advertise the presence of the PCE to the second SSDN domain and negotiate a direct communication protocol with a PCE component in the second SSDN domain, for example PCE Protocol (PCEP). The following example code snippet may be added to a jingle message to advertise and/or negotiate a communication protocol between PCE components in different SSDN domains:

```
<iq from='bus1@x1.s1.com' to='bus2@x2.s2.com' type='set' id='xs51r0k4'>
    <jingle xmlns='urn:xmpp:jingle:1 '
        action='content-add'
        initiator=' bus1@x1.s1.com'
        sid='a73sjjvkla37jfea'>
        <content creator='initiator' name='pce'>
            <item xmlns='http://jabber.org/protocol/disco#items'
                node='bus1@x1.s1.com/pce1'/>
            <transport>...</transport>
        </content>
    </jingle>
</iq>
```

Upon setting up the session between the PCEs, the PCEs may collaborate to compute inter domain path(s) across both SSDN domains. In another example, the SSDN domains may comprise software pathlet router components, which may compute pathlets (e.g. routes) across a domain. The following example code snippet may be added to a jingle message to advertise and/or negotiate a communication protocol between software pathlet router components in different SSDN domains:

```
<iq from='bus1@x1.s1.com' to='bus2@x2.s2.com' type='set' id='xs51r0k4' >
    <jingle xmlns='urn:xmpp:jingle:1 '
        action='content-add'
        initiator=' bus1@x1.s1.com'
        sid='a73sjjvkla37jfea'>
        <content creator='initiator' name='pathlet'>
            <item xmlns='http://jabber.org/protocol/disco#items'
                node='bus1@x1.s1.com/pathlet1'/>
            <transport>...</transport>
        </content>
    </jingle>
</iq>
```

Upon setting up the session between the software pathlet router components, the pathlet routers may collaborate to compute inter domain path(s) across both SSDN domains.

The federation of method 800 may be static, scheduled, and/or on demand. In other words, SSDN domains may maintain a constant communication session, begin a communication session at scheduled intervals, and/or create communication sessions as needed by component(s) in either domain. SSDN domain components may by dynamically added and/or removed from a session via content-add, content-modify, and/or other actions in jingle messages. The federated components may also use the XMPP jingle messages for performance optimization, for example by negotiating interoperable and/or native protocols such as Transmission Control Protocol (TCP)/IP, etc. XMPP authentication, authorization, and federation protocols may be employed to provide security for inter-domain communications between SSDN components. XMPP may also support real-time network monitoring by network administrators controlling the SSDN domains. XMPP may also be employed relatively seamlessly with existing hardware as XMPP may be based on XML. XMPP deployments may also support near real-time interactions with large scale connections on the order of millions of concurrent users.

Figure 9:
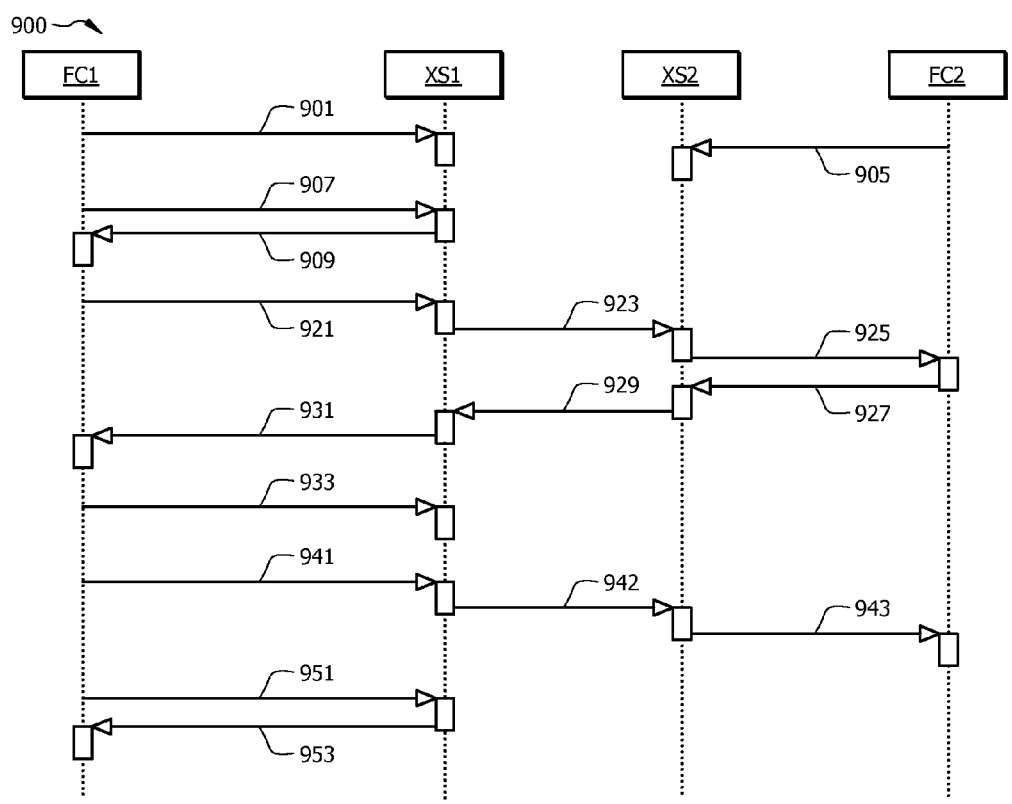
FIG. 9 is a protocol diagram of another embodiment of a method of SSDN federation.

FIG. 9 is a protocol diagram of another embodiment of a method 900 of SSDN federation. Method 900 may be similar to method 800, but may be employed to initiate a XMPP session between three or more SSDN domains using a MUC. It should be noted that a MUC may also be employed to support communications between two SSDN domains according to method 900 even though the two domains may communicate without the MUC as discussed in method 800. At steps 901 and 905, FC1 and FC2 may login to XS1 and XS2 in a manner substantially similar to 801 and 805, respectively. XS1 may be aware of FC1 at the completion of step 901 and XS2 may be aware of FC2 at the completion of step 905. XS 1 and XS2 may also advertise the presence of each federation controller to the other federation controller(s) in a manner similar to steps 803, 807, 809, and/or 811. In the case of several SSDN domains (additional domains omitted to promote simplicity and/or clarity), such a process may continue until each federation controller and each XMPP server is aware of all other XMPP servers and federation controllers.

FC1 may determine to create a MUC to allow SSDN messages to be transmitted to a plurality of other SSDN domains. At step 907, FC1 may transmit a XMPP create MUC message to XS 1. The message may be assigned a destination address of muc@x1.s1.com and forwarded across the service bus to XS1 via the XMPP client. Upon receiving the MUC creation message, XS1 may create and/or host a MUC and transmit a XMPP success message back to FC1 at step 909. At steps 921, 923, and 925, FC1 may initiate a session with FC2 in a manner similar to steps 821, 823, and 825. The XMPP jingle session initiate message of steps 921, 923, and 925 may indicate that responsive messages should be transmitted via the MUC created at steps 907 and 909 by indicating a return address of muc@x1.s1.com. FC2 may respond with a XMPP jingle session accept message at steps 927 and 929 in a manner similar to steps 827 and 829. The message of steps 927 and 929 may be addressed to the MUC at XS1 using muc@x1.s1.com. At step 931, and XS1 may add FC2 to the MUC and forward the accept message to all components on the MUC (e.g. FC1). XS1 may add FC2 to the MUC before or after forwarding the accept message depending on implementation. At step 933, FC1 may initiate sessions with additional SSDN domains, additional SSDN components, or combinations thereof in a manner substantially similar to steps 921, 923, 925, 927, 929, and 931 by addressing a jingle session initiate message with a destination address with the appropriate JID of the SSDN component, bus, and/or XMPP server and a source address of the MUC host (e.g. muc@x1.s1.com).

At steps 941, 942, and 943, FC1 may transmit SSDN messages to all components on the MUC in a manner similar to steps 841, 842, and 843. Message 941 may be addressed to the MUC, and XS1 may transmit copies of message 941 to all XMPP servers associated with components on the MUC at steps 942 and 943. As with method 800, it should be noted that the SSDN messages may be transmitted only from the session initiator (e.g. unidirectional) and/or may also be transmitted from the SSDN domain components joined to the MUC back to the initiator (e.g. bidirectional). Once SSDN message transmission is complete, FC1 may determine to cancel the MUC and terminate the session. At step 951, FC1 may transmit a XMPP cancel message to XS1 by addressing the message to muc@x1.s1.com and forwarding the message over the service bus. XS1 may receive the message of step 951, cancel the MUC, inform all components on the MUC and/or associated XMPP servers of the cancellation, and transmit a cancellation success message to FC1 at step 953.

Figure 10:
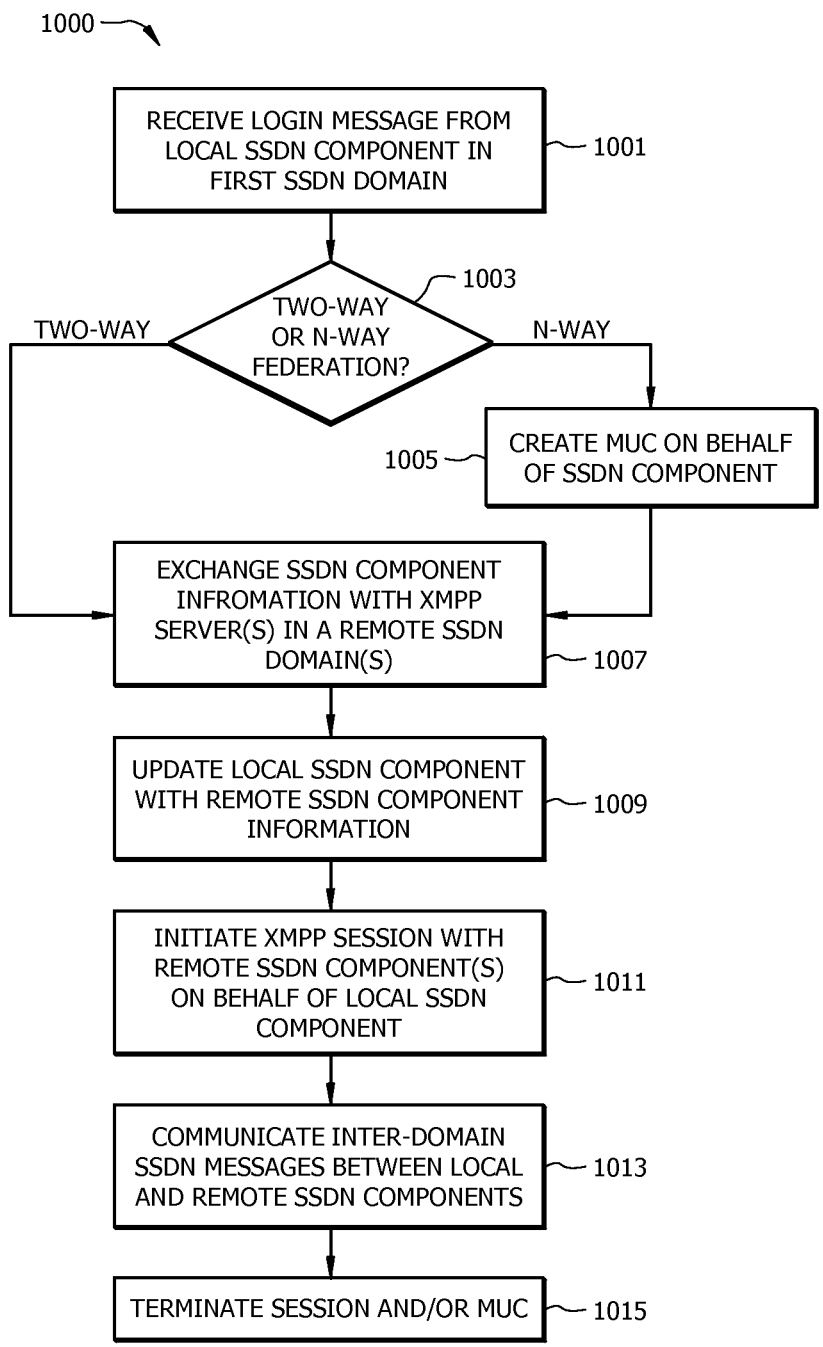
FIG. 10 is a flowchart of another embodiment of a method of SSDN federation.

FIG. 10 is a flowchart of another embodiment of a method 1000 of SSDN federation. Method 1000 may be implemented on a XMPP server in a first domain to support communications between SSDN component(s) in the first domain with SSDN component(s) in other SSDN domain(s) as discussed above. Prior to the implementation of method 1000, the XMPP server may be aware of other XMPP server(s) in the remote SSDN domain(s) and may or may not be in communication with such remote XMPP server(s). At step 1001, a login message may be received from a local SSDN component positioned in the first SSDN domain. At step 1003, the method 1000 may determine whether a two way or an N-way (e.g. three or more way) federation is requested. As examples, federation specifics may be explicitly requested by the first SSDN component, may be the result of a preprogrammed response by the XMPP server to a particular type of login message from the SSDN component, and/or may be based on information from a remote XMPP server. The method 1000 may proceed to step 1005 and create a MUC on behalf of the local SSDN component if an N-way federation is requested. The method 1000 may then proceed to step 1007. If two way federation is requested, the method 1000 may proceed directly to step 1007. At step 1007, the method 1000 may exchange SSDN component information with one or more XMPP servers positioned in one or more remote SSDNs. At step 1009, the local SSDN component may be updated with remote SSDN component information obtained at step 1007. The remote SSDN component information may comprise the address(es) and/or other information relating to the remote SSDN components. At step 1011, a XMPP session may be initiated with the remote SSDN component(s) on behalf of the local SSDN component. At step 1013, the inter-domain SSDN messages may be communicated between the local and remote SSDN components. Once all SSDN messages have been exchanged, the session and/or MUC may be terminated at step 1015. As discussed above, messages communicated to/from the local SSDN component may be exchanged via a serial bus and/or XMPP client. Messages communicated to/from the remote SSDN components may be exchanged via a remote XMPP server positioned in the associated remote SSDN domain.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer program product for communicating between a plurality of Software-Service-Defined-Networks (SSDNs), the computer program product comprising computer executable instructions stored on a non-transitory computer readable medium such that when executed by a processor cause a local Extensible Messaging and Presence Protocol (XMPP) server in a local SSDN domain to:
  receive a data packet from a local component controller positioned in the local SSDN domain via a local service bus, wherein the local service bus is configured to support intra-domain communication between SSDN components, and wherein the local service bus is not configured to support inter-domain communication within the local SSDN domain; and
  transmit the data packet to a remote SSDN component positioned in a remote SSDN domain based on a destination address of the data packet that indicates the remote SSDN component, a remote XMPP server in the remote SSDN domain, and a remote SSDN service bus in the remote SSDN domain.

2. The computer program product of claim 1, wherein the destination address further indicates the remote SSDN component, the remote XMPP server, and the remote SSDN service bus using a Jabber Identifier (JID) format.

3. The computer program product of claim 2, wherein the remote XMPP server is indicated as a JID domain identifier associated with the remote SSDN domain.

4. The computer program product of claim 3, wherein the remote SSDN service bus is indicated as a JID node identifier.

5. The computer program product of claim 4, wherein the remote SSDN component is indicated as a JID resource identifier.

6. The computer program product of claim wherein the destination address comprises a form X@Y/Z, where X indicates the remote SSDN service bus, Y indicates the remote XMPP server, and Z indicates the remote SSDN component.

7. A method of creating a communication session between a plurality of Software-Service-Defined-Network (SSDN) domains via a local Extensible Messaging and Presence Protocol (XMPP) server positioned in a local SSDN domain, wherein the method comprises:
receiving a login message from a local SSDN component positioned in the local SSDN domain via a local service bus, wherein the local service bus is configured to support intra-domain communication between SSDN components, wherein the local service bus is not configured to support inter-domain communication within the local SSDN domain, and wherein the login message indicates the local SSDN component by an address that comprises a local SSDN component identifier, a local service bus identifier, and a local XMPP server identifier; and
in response to receiving the login message, advertising the local SSDN component address to a remote SSDN component positioned in a remote SSDN domain via a remote XMPP server positioned in the remote SSDN domain.

8. The method of claim 7, further comprising:
receiving a message advertising an address of a remote SSDN component positioned in the remote SSDN domain, wherein the remote SSDN address identifies the remote SSDN component, the remote XMPP server, and a remote SSDN domain service bus; and
forwarding the remote SSDN component address to the local SSDN component via the local service bus.

9. The method of claim 8, further comprising initiating a session with the remote SSDN component on behalf of the local SSDN component by transmitting a jingle session initiate message to the remote SSDN component via the remote XMPP server by transmitting the jingle session initiate message to the remote SSDN address.

10. The method of claim 9, further comprising:
receiving a jingle session accept message from the remote SSDN component via a second XMPP server, wherein the jingle session accept message comprises the local SSDN component address; and
forwarding the jingle session accept message to the local SSDN component via the local service bus.

11. The method of claim 10, further comprising:
receiving a jingle session terminate message from the local SSDN component, wherein the jingle session terminate message comprises the remote SSDN component address; and
terminating the session by forwarding the jingle session terminate message to the remote SSDN component via the remote XMPP server.

12. The method of claim 10, further comprising:
receiving a jingle session terminate message from the local SSDN component, wherein the jingle session terminate message comprises the local SSDN component address; and
terminating the session by forwarding the jingle session terminate message to the remote SSDN component via the remote XMPP server.

13. The method of claim 10, further comprising communicating SSDN messages between the local SSDN component and the remote SSDN component via the local service bus, the local XMPP server, and the remote XMPP server.

14. The method of claim 8, further comprising dynamically adding the remote SSDN component to an active Multi-User Chat (MUC) session by transmitting a jingle session initiate message to the remote XMPP server, wherein the jingle session initiate message comprises the address of the local SSDN component and the address of the remote SSDN component.

15. An apparatus comprising:
a processor configured to:
operate as a local component in a local Software-Service-Defined-Network (SSDN) domain; and
initiate a communication session with a remote SSDN component positioned in a remote SSDN domain via an Extensible Messaging and Presence Protocol (XMPP) jingle initiate message; and
a transmitter coupled to the processor and configured to transmit the jingle initiate message to the remote SSDN component via a local SSDN service bus positioned in a local SSDN domain via a local XMPP server,
wherein the local service bus is configured to support intra-domain communication between SSDN components,
wherein the local service bus is not configured to support inter-domain communication within the local SSDN domain, and
wherein the jingle initiate message comprises an address of the remote SSDN component comprising a remote SSDN component identifier, a remote XMPP server identifier, and a remote service bus identifier.

16. The apparatus of claim 15, wherein the jingle initiate message directs the remote SSDN component to join a Multi-User Chat (MUC) session at a MUC address comprising a MUC session identifier, a local SSDN component identifier, a local XMPP server identifier, and a local service bus identifier.

17. The apparatus of claim 16, wherein the processor is further configured to communicate with the remote SSDN component via the transmitter and the local SSDN service bus by transmitting an Extensible Markup Language (XML) stream to the MUC address.

18. The apparatus of claim 15, wherein the jingle initiate message comprises a content add action that specifies a communication protocol to support a direct connection between the local SSDN component and the remote SSDN component.

19. The apparatus of claim 18, wherein the processor is further configured to communicate with the remote SSDN component via the transmitter using the communication protocol specified in the jingle initiate message content add action.

20. The apparatus of claim 15, wherein the local SSDN component is a first Network Information Base (NIB), wherein the remote SSDN component is a second NIB, and wherein the communication session supports cross domain sharing of private network domain data between the NIBs.

\* \* \* \* \*

UNITED STATES PATENT AND TRADEMARK OFFICE
CERTIFICATE OF CORRECTION

PATENT NO. : 9,491,264 B2
APPLICATION NO. : 14/185661
DATED : November 8, 2016
INVENTOR(S) : Li Li and Wu Chou It is certified that error appears in the above-identified patent and that said Letters Patent is hereby corrected as shown below:

In the Claims
Column 17, Lines 13-17, Claim 6, should read:
6. The computer program product of claim 5, wherein the destination address comprises a form X@Y/Z, where X indicates the remote SSDN service bus, Y indicates the remote XMPP server, and Z indicates the remote SSDN component.

Signed and Sealed this
Twenty-eighth Day of February, 2017

Michelle K. Lee
*Director of the United States Patent and Trademark Office*